H. H. & H. T. HIPWELL.
DISPLAY FRAME.
APPLICATION FILED FEB. 28, 1911.
1,001,403.
Patented Aug. 22, 1911.
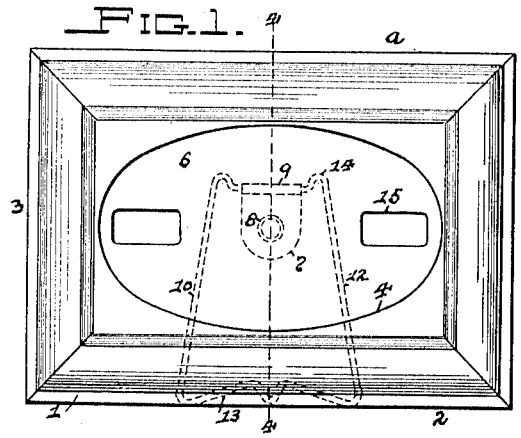
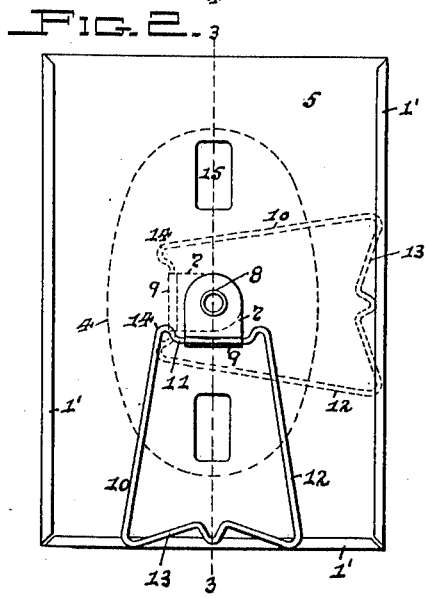
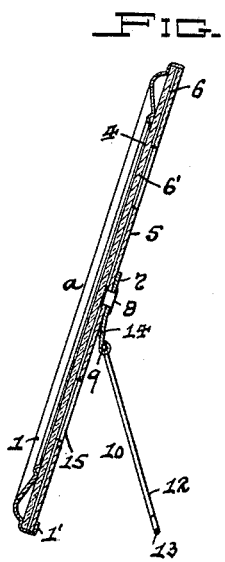
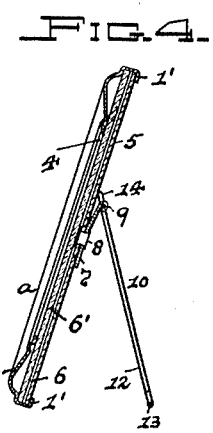
Witnesses:
A. D. P. Miller.
W. C. Cooke
Inventors:
Harry H. Hipwell
Harry Thomas Hipwell
By J. N. Cooke,
Attorney.

UNITED STATES PATENT OFFICE.

HARRY H. HIPWELL AND HARRY THOMAS HIPWELL, OF PITTSBURG, PENNSYLVANIA.

DISPLAY-FRAME.

1,001,403.   Specification of Letters Patent.   Patented Aug. 22, 1911.

Application filed February 28, 1911.   Serial No. 611,525.

*To all whom it may concern:*

Be it known that we, HARRY H. HIPWELL and HARRY THOMAS HIPWELL, residents of Pittsburg, North Side, in the county of Allegheny and State of Pennsylvania, have invented a new and useful Improvement in Display-Frames; and we do hereby declare the following to be a full, clear, and exact description thereof.

Our invention relates to frames for displaying pictures, photographs, postal cards, etc., and has special reference to easel means on such frame for supporting the same.

The object of our invention is to provide a cheap, simple and efficient easel support for such display frames which will enable such frame to be supported at either end or either side of the same, as desired, and will be capable of easy and rapid adjustment or movement for the position desired for the frame.

To these ends our invention consists, generally stated, in the novel arrangement, construction and combination of parts, as hereinafter more specifically set forth and described and particularly pointed out in the claim.

To enable others skilled in the art to which our invention appertains to construct and use our improved display frame, we will describe the same more fully, referring to the accompanying drawing, in which—

Figure 1 is a front view of our improved display frame showing by dotted lines the easel in its folded position against the back of the frame and ready to be extended to support the frame on one of its sides. Fig. 2 is a rear view of the frame showing the easel in the position shown in Fig. 1 by full lines and by dotted lines the position of the easel for supporting the frame on one of its ends and on one of its sides, respectively. Fig. 3 is a longitudinal section of the frame on the line 3—3 Fig. 2, and with the easel in position for supporting the frame on one of its ends. Fig. 4 is a cross-section of the frame on the line 4—4, Fig. 1, and showing the easel in position for supporting the frame on one of its sides.

Like symbols of reference herein indicate like parts in each of the figures of the drawing.

As illustrated in the drawing, 1 represents the body or main front portion of the frame *a*, which is of the usual rectangular shape by having its sides 2 and ends 3, and as shown is of sheet metal, such as brass. This body 1 is provided with the usual display opening 4 within the same, and in the rear of such frame is the back-plate 5, preferably of card or paste-board or other suitable material, which is connected to the frame by bending the sides and one of the ends of the frame over the same, as at 1', while between such plate and the glass plate 6' against the frame front 1 is the sheet 6, and which is preferably formed of paper or other suitable material.

Fitting against the outer face of the back-plate 5 is a spring plate 7, which is preferably formed of thin sheet metal, such as steel, and is secured to such back by an eyelet 8 extending through a hole or opening in said back and at one end of said plate so as to form a pivotal connection for such plate with said back. The other end of the spring plate 7 is bent, as at 9, to form a tubular sleeve beyond the pivotal axis of said plate as formed by said eyelet 8 and within such sleeve is pivotally connected the standard 10 for forming the easel by its top or upper end portion 11. This standard 10 is preferably formed from a single piece of wire such as steel and bent to shape to form an open frame, having such top portion 11, side portions 12 and bottom or base portion 13, with such side portions in connecting with said top portion being adapted to form rounded portions 14 extending above and at each end of said top portion beyond the pivoting sleeve 9 on the plate 7.

The use and operation of our improved display frame *a* is as follows:—With the easel standard 10 in the position as shown by the full lines in Fig. 2, the base portion 13 of the same can be swung out on the pivoted top portion 11 in the sleeve 9 on the plate 7, which will allow the end of the body 1 of the frame *a* at such base portion to be supported by said base portion when such portion and such end are resting upon an object such as a table or mantle, as shown in Fig. 3, and when in this position the end of such plate carrying such sleeve is below the pivotal eyelet 8 for such plate and is sprung out by said top portion and the engagement of the rounded extensions 14 on the said standard which will hold said standard and the frame *a* in the position desired. When it is desired to support the frame *a* on one of its sides, the easel standard 10 and plate 7 is swung around on the pivotal eyelet 8 and such standard is swung in the pivotal sleeve 9 on said plate by its top portion 11, so that the end of said plate carrying such sleeve is above such eyelet or beyond the pivotal axis of said plate, and then the base portion 13 on said standard can be swung out on said pivoted top portion, so that such side of the body 1 at such base portion can be supported by said side and base when they are resting upon an object. When the standard 10 is thus swung over on the sleeve 9 of the plate 7, the rounded extensions 14 on said standard will pass along and engage with the back-plate 5 and thereby spring out the sleeve end of said plate, and when the said standard and side of the body 1 are thus resting upon the object in supporting the frame $a$, the said extension will come against said back and the sleeve end of said plate will be sprung out to hold said standard and frame in the desired position, as heretofore described.

If desired, the back-plate 7 and sheet 6 can be provided with holes or slots 15 within the same in order to allow access by the fingers against the photograph, card or other display in the frame $a$ in order to properly position the same with respect to the opening 4 in the frame body 1 by moving such display, and various other modifications and changes in the design, materials and shape of the various parts of our improved frame may be resorted to within the scope of the appended claim without departing from the spirit of the invention or sacrificing any of its advantages.

It will thus be seen that our improved easel support for a display frame can be easily and cheaply manufactured and applied to a frame, and when so assembled it can be easily and quickly positioned for supporting the frame either on one of its ends or one of its sides, as desired, while at the same time when in either position it will enable the frame to be securely held at the desired inclination, so that it will therefore not be liable to permit the easel to open up or collapse and break the glass usually employed in these frames between the sheet and front of the frame. The parts of the easel being formed of metal will be strong and durable, will not be liable to break, bend or get out of order and will be capable of easy movement to the positions desired such as in the supporting of the frame or in the collapsing position for the packing or handling.

What we claim as our invention and desire to secure by Letters Patent is—

The combination with the back of a display frame, of an easel supporting means for such frame comprising a rotatable spring metal plate pivotally connected at one end to said back, a standard pivotally connected at its top portion to the other end and at one side of the pivotal axis of said plate, and extensions on said standard above said top portion and on the sides of the pivotal connection of said standard for engaging with said back, said plate being adapted to hold the standard in its adjusted position.

In testimony whereof we, the said HARRY H. HIPWELL and HARRY THOMAS HIPWELL, have hereunto set our hands.

HARRY H. HIPWELL.
HARRY THOMAS HIPWELL.

Witnesses:
J. N. COOKE,
HAZEL WIBERLY.

Copies of this patent may be obtained for five cents each, by addressing the "Commissioner of Patents, Washington, D. C."